United States Patent [19]

Fabricant

[11] 4,231,181
[45] Nov. 4, 1980

[54] DENTAL TOY

[76] Inventor: Norman Fabricant, 94-19 64th Rd., Rego Park, N.Y. 11374

[21] Appl. No.: 17,306

[22] Filed: Mar. 5, 1979

[51] Int. Cl.³ .......................................... A63H 13/00
[52] U.S. Cl. ...................................... 46/116; 46/171; 35/1
[58] Field of Search ................. 46/164, 171, 116, 1 R; 35/1, 17; 433/34

[56] References Cited

U.S. PATENT DOCUMENTS

| | | | |
|---|---|---|---|
| 1,370,191 | 3/1921 | Crate | 433/34 X |
| 1,598,052 | 8/1926 | Chayes | 35/1 |
| 1,867,300 | 7/1932 | Bailey | 433/34 |
| 2,904,929 | 9/1959 | Weih | 46/171 |
| 2,959,891 | 11/1960 | Barnett et al. | 46/116 X |
| 3,170,265 | 2/1965 | Goldfarb | 46/116 |
| 4,073,071 | 2/1978 | Angelotti | 35/17 X |

Primary Examiner—Gene Mancene
Assistant Examiner—Mickey Yu
Attorney, Agent, or Firm—Alan H. Levine

[57] ABSTRACT

A dental toy including at least one simulated jaw, and preferably two jaws hinged to each other for movement between open and closed positions. Each jaw carries a series of tooth-retaining means, such as pockets for accommodating the roots of simulated teeth. Each jaw may include a partly circular plate, the tooth-retaining means being located in an arcuate pattern near an edge of the plate. The teeth may be simulated by a soft moldable material, and a mold may be employed to shape the material into teeth. Alternatively, the teeth may be rigid and have simulated cavities fillable with a soft moldable filling compound. One or more simulated dental tools are provided, such as a drill body having changeable drill and brush bits rotatable by a mechanism within the body, a dental mirror, and tooth-holding tongs.

12 Claims, 7 Drawing Figures

DENTAL TOY

This invention relates to toy with which a child can "play dentist".

It is an object of the invention to provide a toy which permits a child to drill, fill, and pull simulated teeth in a "patient's" mouth, as well as perform other activities ordinarily carried out by a dentist.

It is another object of the invention to provide a toy with which a child can make new simulated teeth, insert them into a patient's mouth, and if desired operate on the teeth. However, the invention also comtemplates that a supply of simulated teeth may be furnished as part of the toy.

Additional objects and features of the invention will be apparent from the following description in which reference is made to the accompanying drawings.

Figure 1:
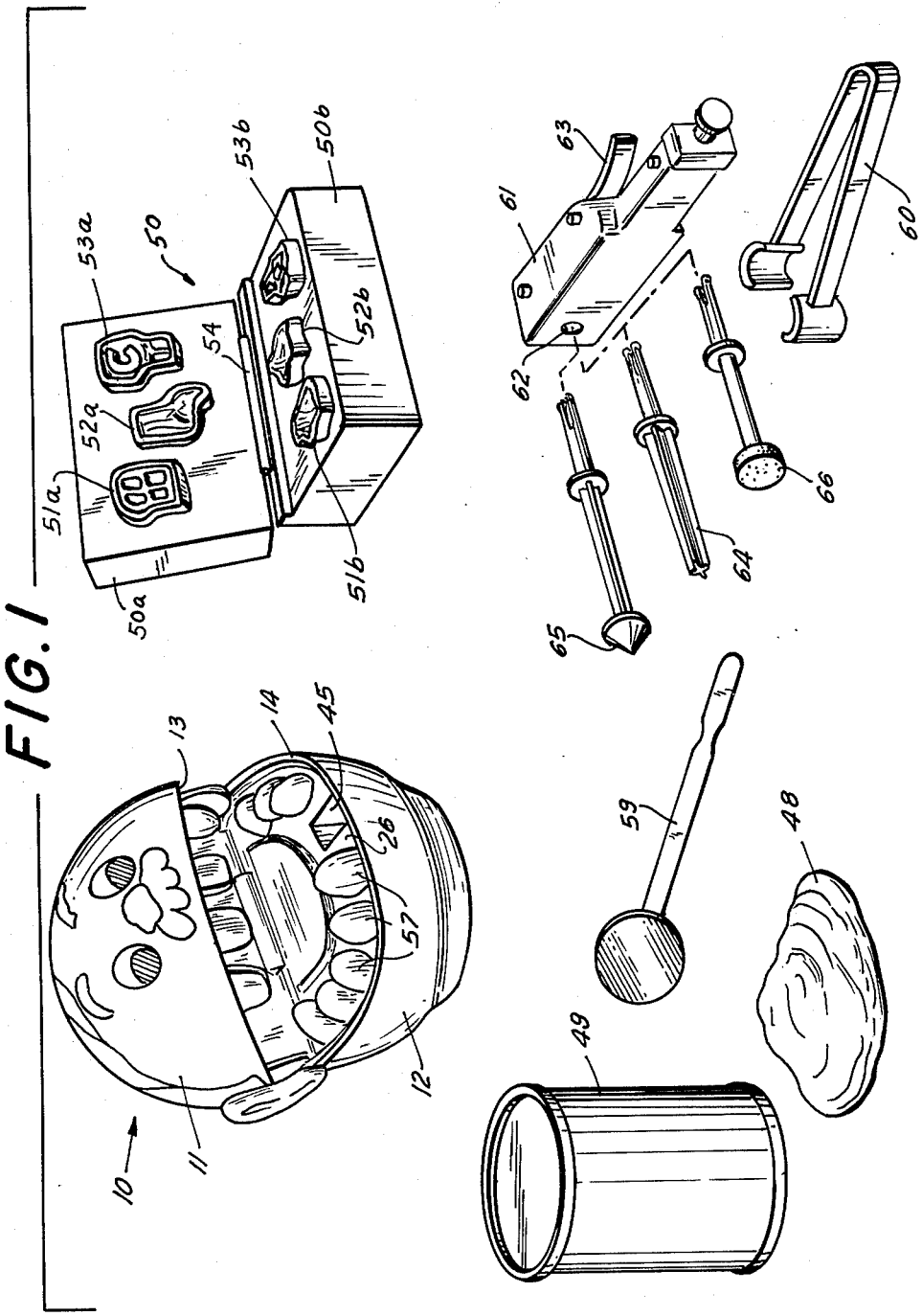
FIG. 1 is a perspective view of various parts of a dental toy according to this invention.

The toy chosen to illustrate the present invention includes a head 10 (FIGS. 1 and 2) representing a "patient" who needs dental work. The head includes an upper dome-like part 11, and a lower bowl-like part 12, the lower portion of part 12 being reduced in diameter to suggest transition to a neck. The edge 13 of upper part 11 and edge 14 of lower part 12 may be thought of as the lips of the patient's mouth.

Figure 5:
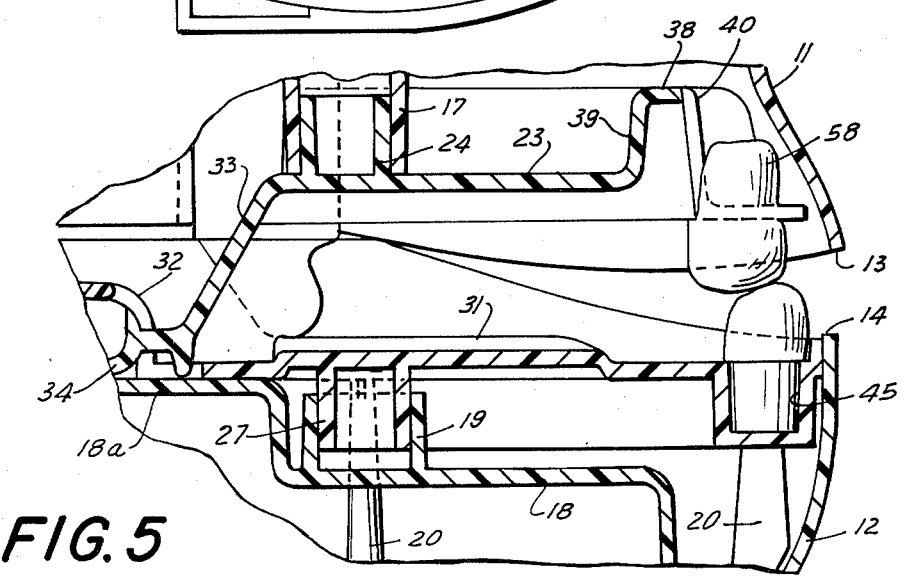
FIG. 5 is a fragmentary cross-sectional view, similar to FIG. 2, showing the jaws closed.

Upper and lower parts 11 and 12 are generally hollow, although there are structural elements within them to permit upper and lower jaw plates (described below) to be secured to the head parts. The structural elements in upper head part 11 include a relatively large diameter hollow post 17 (FIGS. 2 and 5) projecting downwardly from the center of part 11, and three smaller posts (not shown) parallel to and radially spaced from post 17. The structural elements in lower head part 12 include an upwardly projecting bottom wall 18 (FIGS. 2 and 5) having a stepped configuration, one of the steps carrying a short relatively large diameter hollow post 19. Arranged around the periphery of the lower head part are a series of six smaller posts 20, only three being shown in FIG. 2. Preferably, each of the head parts 11 and 12, and their respective internal structural elements are formed as one piece of molded plastic. Furthermore, head part 11 may be decorated with human features such as eyes, a nose, and ears.

Figure 4:
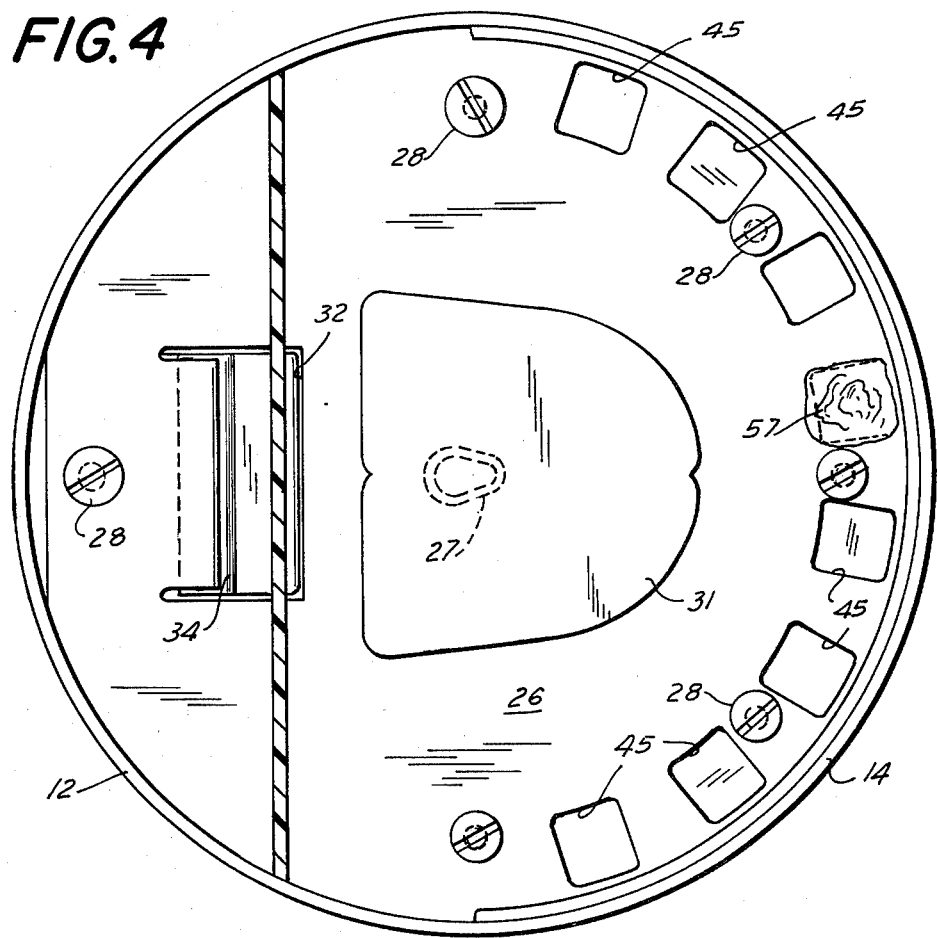
FIG. 4 is a cross-sectional view taken along line 4—4 of FIG. 2, showing the face of the lower jaw plate.
Figure 6:
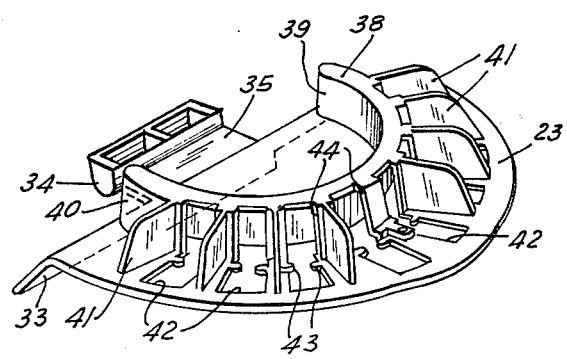
FIG. 6 is a top perspective view of the upper jaw plate.

Secured to upper head part 11 is an upper jaw plate 23 (FIGS. 2, 3, 5, and 6). A hollow post 24 projects upwardly from the jaw plate and fits snugly within the lower end of post 17, and three screws 25 (FIG. 3) pass through three holes in jaw plate 23 into the three smaller posts carried by head part 11 to firmly secure jaw plate 23 to head part 11. A lower jaw plate 26 (FIGS. 1, 2, 4, and 5) is fixed to lower head part 12. A hollow post 27 projects downwardly from the jaw plate and fits snugly within the upper end of post 19, and six screws 28 (FIGS. 2 and 4) pass through six holes in jaw plate 26 into the six posts 20 carried by head part 12 to firmly secure jaw plate 26 to head part 12. Preferably each jaw plate 23 and 26 is made of molded plastic.

Lower jaw plate 26 is generally circular, and at its center is molded with a raised portion 32 resembling a tongue. To the rear of tongue 31, jaw plate 26 is stepped upwardly, and an elongated slot 32 is formed in the step. Upper jaw plate 23 is generally semicircular; its rear portion 33 is inclined downwardly and rearwardly, and a semicylindrical hinge member 34 is supported by a connecting strip 35 projecting from the rear edge of inclined portion 33. Upper head part 11 and upper jaw plate 23 are assembled with lower head part 12 and jaw plate 26 by passing hinge member 34 through slot 32. The hinge member is thereby located within a socket defined by the stepped portion of jaw plate 26 and the topmost step 18a of bottom wall 18. Hinge member 34 is pivotable within the socket about its longitudinal axis so that the upper head part 11 and upper jaw plate 23 may be swung between the position shown in FIG. 2, wherein the patient's mouth is open, and the position shown in FIG. 5, wherein the patient's mouth is closed.

The upper surface of upper jaw plate 23 carries a semicircular ridge 38 (FIGS. 2, 3, 5, and 6) having an inverted U-shaped cross-section defining inner and outer walls 39 and 40, respectively, of the ridge. A series of strengthening fins 41 project radially outwardly from outer wall 40 of ridge 38, and between each two successive fins jaw plate 23 is provided with a tooth-retaining means in the form of an opening 42. Openings 42 are located in an arcuate pattern close to the front peripheral edge of jaw plate 23. Each opening 42 is narrowed by a pair of opposed bumps 43, and then continues radially inwardly to join a vertical slot 44 in outer wall 40 of ridge 38. As will be pointed out below, slot 44 serves to provide access to opening 42 when inserting a simulated tooth into the opening.

Lower jaw plate 26 is also formed with a series of tooth-retaining means, illustrated as generally rectangular depressions or pockets 45 in the plate. Pockets 45 are located in an arcuate pattern close to the front peripheral edge of the jaw plate.

The toy also includes means for simulating teeth. In one embodiment, this means includes a soft moldable material 48 (FIG. 1), such as the dough-like compound sold by Kenner Products under the trademark "Play-Doh". This product is usually sold in an air-tight container 49. However, other suitable materials, such as modeling clay, may be employed. While teeth could be molded by hand, preferably a mold 50 is used. The mold comprises two blocks 50a and 50b hinged together at 54. In this example, the mold has three cavities for molding three different shapes of teeth corresponding to three different shapes of natural teeth. Blocks 50a is formed with cavity halves 51a, 52a, and 53a, and block 50b is formed with cavity halves 51b, 52b, and 53b. When blocks 50a and 50b are pivoted to close the mold, the three complete cavities 51, 52, and 53 are formed. In use, a glob of the material 48 is placed on one of the cavity halves, say cavity half 51b, the mold is closed, and then opened, as a result of which the glob is molded into the shape of a tooth. Each cavity is shaped such that each tooth 57 produced is formed with a root portion 58 sized to fit snugly into any pocket 45 in lower jaw plate 26, or any opening 42 in upper jaw plate 23.

Figure 2:
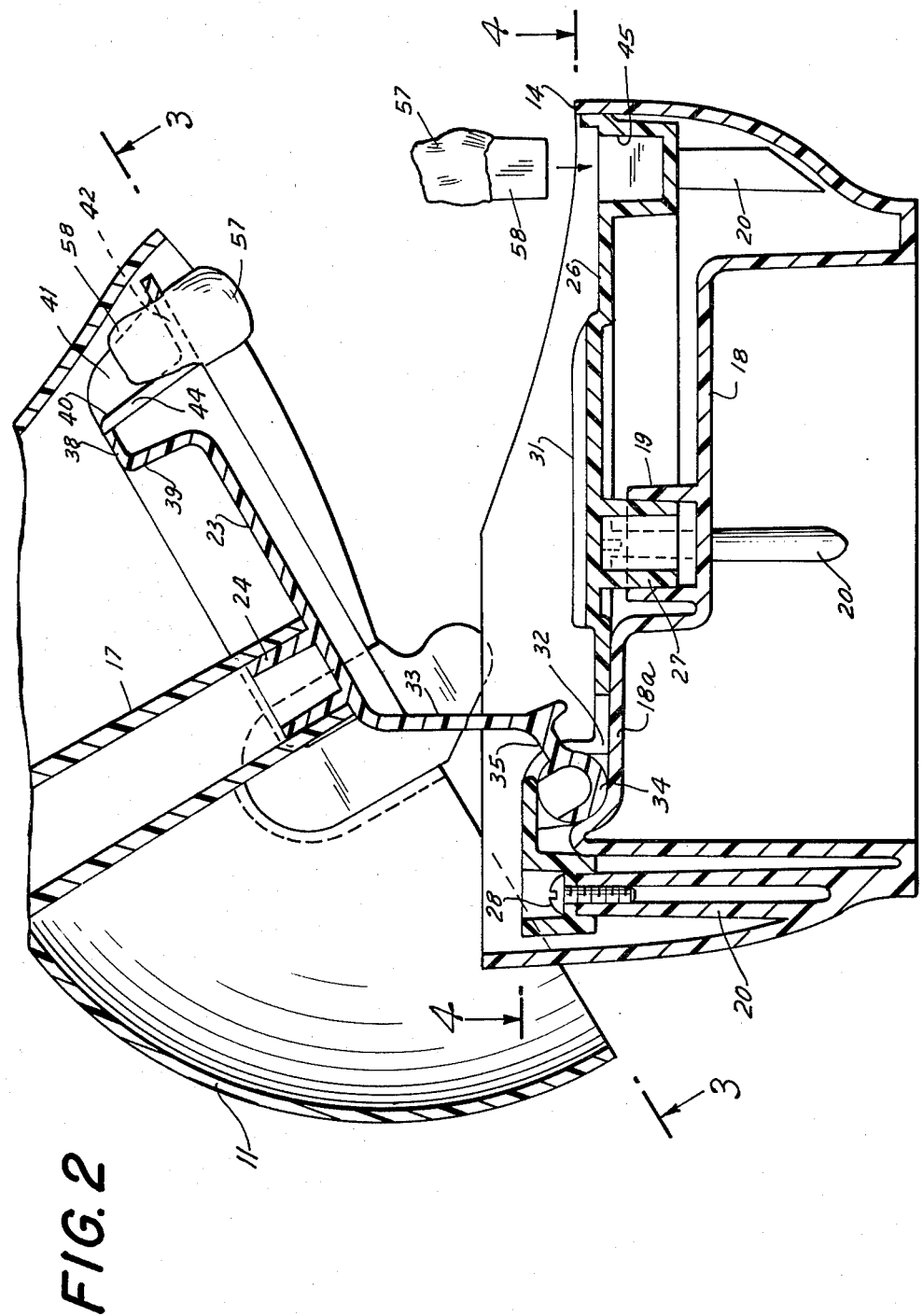
FIG. 2 is a vertical cross-sectional view through a toy head, including hinged upper and lower jaws in open condition.
Figure 3:
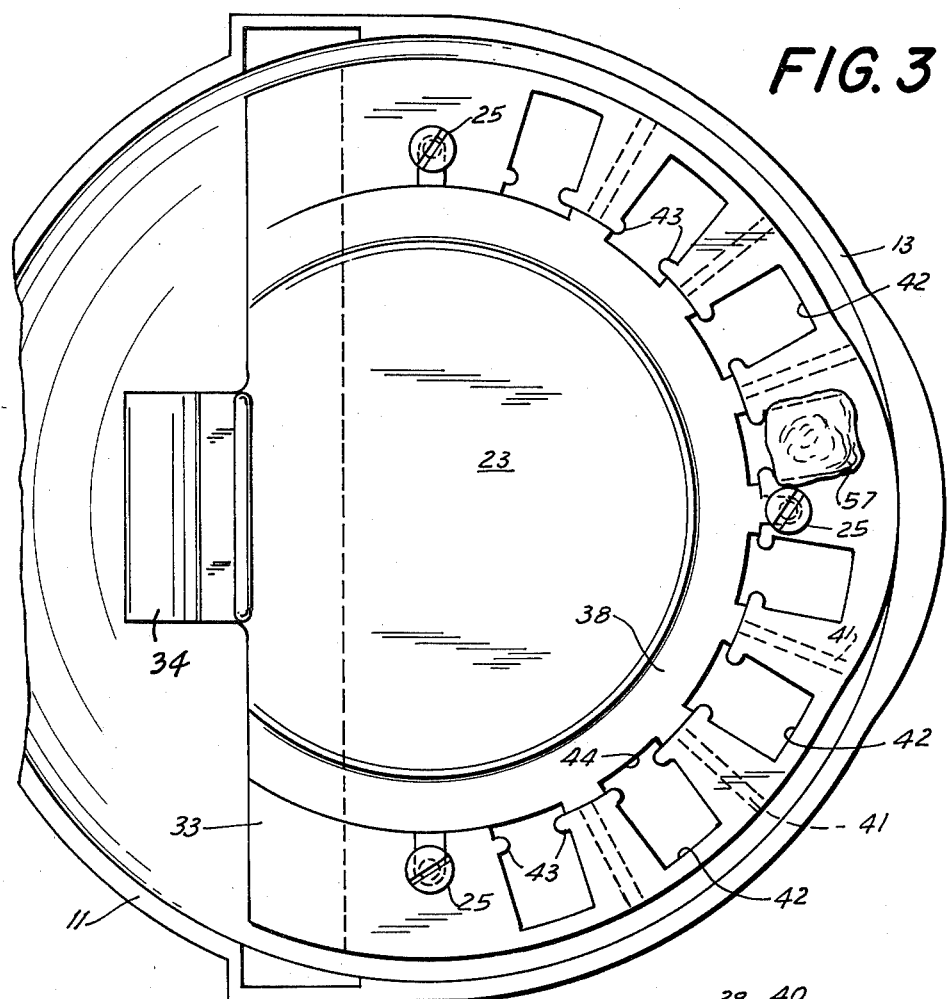
FIG. 3 is a cross-sectional view taken along line 3—3 of FIG. 2, showing the face of the upper jaw plate.

The toy also comprises a variety of simulated dental instruments. For example, FIG. 1 illustrates a dental mirror 59 and a tongs 60 for grasping a tooth to manipulate it. Also included is a drill body 61 and an assortment of bits adapted to be inserted into a hole 62 in body 61. The drill body is conventional and contains a gear train so that when a handle 63 is pressed toward the body, a bit mounted in hole 62 is rotated. The bits include a drill bit 64, a burnishing bit 65, and a cleaning brush bit 66. Obviously, many other types of simulated dental tools (not shown) may be provided, such as a dental pick, sterilizer box, X-ray machine, and hypodermic needle.

In playing with the toy, a child can mold a tooth or teeth using material 48 and mold 50. The root 58 of the tooth is then placed in one of the pockets 45, if the tooth is to be a lower tooth. If an upper tooth is desired, the tooth is inverted so that its root is up, and the root inserted into the space between walls 39 and 40 of ridge 38. The tooth is then moved forwardly through a slot 44 into an opening 42. The edges of opening 42 cut into the tooth root and thereby hold the tooth in place.

The child may then operate on the tooth. A hole may be drilled in the tooth, using drill body 61 and drill bit 64, to simulate a cavity which is then filled with some of the material 48. If desired, supplies of material 48 in silver and gold color may be provided to simulate tooth filling and crowning material. The filling can then be smoothed with burnishing bit 65 in drill body 61, after which the tooth can be cleaned with brush 66 in drill body 61. Throughout these procedures, the child may use mirror 59 in the usual professional way. If desired, the child can decide to remove a tooth, using tongs 60, and replace it with a newly molded tooth.

Figure 7:
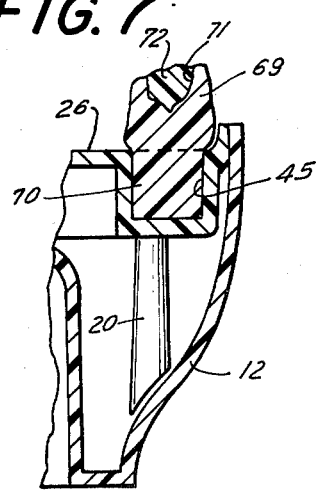
FIG. 7 is a fragmentary cross-sectional view of the lower jaw accommodating an alternative type of tooth according to the invention.

According to another embodiment of the invention, the means for simulating a tooth, and illustrated in FIG. 7, is a tooth 69 of a more permanent nature, such as may be formed of molded plastic. The toy may include a complete set of such teeth, each having a root 70 for cooperating with pockets 45 and openings 42. Tooth 69 is formed with an indentation 71 simulating a cavity in the tooth. The child then fills cavity 71 with a moldable filling material 72,, which may be suitably colored "Play-Doh" compound. Thereafter, filling 72 may be drilled out and cavity 71 refilled as many times as desired. In this embodiment, the teeth 69 may be cleaned, burnished, and replaced exactly as described above with respect to teeth 57.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

I claim:

1. A dental toy comprising:
   (a) at least one simulated jaw,
   (b) a series of tooth-retaining means carried by said jaw,
   (c) means for making soft and moldable simulated teeth cooperable with said tooth-retaining means, and
   (d) at least one simulated dental tool for operating on a simulated tooth to alter the contour of the tooth while it is retained by said retaining means,
   whereby the toy can be used to simulate drilling, filling, and other dental work performed by a dentist on real teeth.

2. A dental toy as defined in claim 1 including a pair of simulated jaws, said jaws being an upper jaw and a lower jaw in opposed relation, 3. A dental toy as defined in claim 2 including means for hinging said jaws together for movement toward and away from each other in the manner of two natural jaws.

4. A dental toy as defined in claim 1 wherein each of said tooth-retaining means includes a pocket adapted to receive the root of a simulated tooth.

5. A dental toy as defined in claim 1 wherein said jaw includes an at least partly circular plate, said tooth-retaining means being located in an arcuate pattern near an edge of said plate.

6. A dental toy as defined in claim 5 including a pair of simulated jaws, each jaw including an at least partly circular plate, and means for hinging said plates together along their respective non-circular edges.

7. A dental toy as defined in claim 1 wherein said 'means for making simulated teeth includes a soft moldable material.

8. A dental toy as defined in claim 7 wherein said means for making simulated teeth includes a mold within which said moldable material can be formed into simulated teeth.

9. A dental toy as defined in claim 8 wherein said mold has a cavity in the shape of a tooth, said cavity including a portion for forming a tooth root sized to cooperate with one of said tooth-retaining means.

10. A dental toy as defined in claim 1 wherein said dental tool is a simulated frill having a rotatable drill bit.

11. A dental toy as defined in claim 1 wherein said drill includes a rotatable tooth-cleaning brush useable alternatively with said drill bit.

12. A dental toy as defined in claim 1 wherein said dental tool is a simulated dental mirror.

* * * * *